(12) United States Patent
Keeler

(10) Patent No.: US 6,325,154 B1
(45) Date of Patent: Dec. 4, 2001

(54) HORSE OWNER'S AND FARRIER'S STAND

(76) Inventor: Kevin V. Keeler, 6139 Somerset La., Star, ID (US) 83669

( * ) Notice: Subject to any disclaimer, the term of this patent is extended or adjusted under 35 U.S.C. 154(b) by 0 days.

(21) Appl. No.: 09/454,797

(22) Filed: Dec. 3, 1999

(51) Int. Cl.$^7$ .................................................. A01L 7/00
(52) U.S. Cl. ........................... 168/44; 119/816; 119/755; 119/756; 119/757
(58) Field of Search ............................... 168/44; 119/816, 119/755, 756, 757, 788

(56) References Cited

U.S. PATENT DOCUMENTS

| | | | |
|---|---|---|---|
| 86,455 | * | 2/1869 | Rogers et al. . |
| 89,379 | * | 4/1869 | Blackburn . |
| 427,012 | * | 4/1890 | Reed . |
| 569,819 | * | 10/1896 | Davis et al. . |
| 1,198,467 | * | 9/1916 | Maltby . |
| 1,278,628 | * | 9/1918 | France et al. . |
| 1,472,527 | * | 10/1923 | Jones . |
| 4,167,216 | | 9/1979 | Beaston .................................. 168/44 |

* cited by examiner

*Primary Examiner*—Charles T. Jordan
*Assistant Examiner*—Yvonne R. Abbott
(74) *Attorney, Agent, or Firm*—Ken J. Pedersen; Barbara S. Pedersen

(57) ABSTRACT

An adjustable farrier's stand includes a polyethylene base formed having a large generally flat base and a narrow truncated conical upright receiving portion centrally protruding from the base, a support upright configured to be slidably held within the upright receiving portion and an adjustable holding mechanism for securing the upright within the upright holder at a selected height. A first upright includes a diverging "U" shaped cradle attached to its upper distal end. A nylon strap is slung across the cradle and attached to the opposing ends of the cradle to form a hoof receiving sling. The cradle and strap are configured to securely hold the hoof and absorb concussion associated with nailing and hoof maintenance. A second upright member simply provides a flat surface or platform to receive the bottom of a hoof at an elevated position above the ground for anterior hoof work. Both uprights include upright supports which are sized and shaped to be closely and slidably received within the upright receiving portion and fixed along their respective lengths to adjust the working height by the adjustable holding mechanism.

14 Claims, 4 Drawing Sheets

HORSE OWNER'S AND FARRIER'S STAND

BACKGROUND OF THE INVENTION

1. Technical Field

This invention generally relates to tools for farriers, veterinarians and horse owners. More particularly, this invention relates to a stand for supporting a horse's hoof for horseshoe removal, hoof trimming, horseshoe fitting, horseshoe installation and hoof maintenance.

2. Background

Most farriers physically support the horse's leg during shoeing operations by holding the horse's leg between their own legs, with the horse leg coming up from the farrier's backside. This is a precarious and sometimes dangerous position and always physically demanding. First, the farrier must remove the old horseshoe. Then the hoof must be trimmed and filed. Next, the new shoe must be fitted to the hoof profile and nailed in place. Finally, the nails are clinched and the anterior profile of the hoof is filed and shaped. All of these operations are best performed with the hoof supported at an elevation above ground level.

U.S. Pat. No. 4,167,216 for a Multiple Stand To Aid Shoeing Horses teaches two position tripod type stand having a pair of alternating upright members disposed at a right angle with respect to one another. A pair of opposing legs are connected to the vertex joint of the uprights, each at a slightly obtuse angle with respect to both uprights. In one position, one upright extends vertically upward while the second upright acts as the third leg of the tripod. In the second position, the second upright extends vertically upward while the first upright acts as the third leg of the tripod. A hard hoof cradle is attached to the distal end of one of the uprights and a flat plate is attached to the distal end of the other upright. The cradle holds the hoof in an elevated horizontal position to provide access to the bottom of the hoof, while the flat plate provides an elevated platform to support the bottom of the hoof to provide convenient access to the anterior of the hoof. An optional upright with an anvil attachment can be removably substituted for either of the other two uprights.

Unfortunately, this device suffers from some disadvantages. First, the length of the uprights are not adjustable to accommodate the necessary difference in working height between front and back hooves of a single horse, nor to accommodate different sized horses. Second, the hoof cradle construction does not provide any concussion absorption and is prone to the hoof dislodging from the cradle. Thirdly, the legs and horizontally extending upright (effectively a leg) pose a hazard both to the farrier and to the horse.

What is needed is an adjustable height and safer stand that more securely holds the hoof in the horizontal position.

SUMMARY OF THE INVENTION

One embodiment of the invention includes a polyethylene base formed having a large generally flat base and a narrow truncated conical upright receiving portion centrally protruding from the base, a support upright configured to be slidably held within the upright receiving portion and an adjustable holding mechanism for securing the upright within the upright holder at a selected height. A first upright includes a diverging "U" shaped cradle attached to its upper distal end. A nylon strap is slung across the cradle and attached to the opposing ends of the cradle to form a hoof receiving sling. The cradle and strap are configured to securely hold the hoof and absorb concussion associated with nailing and hoof maintenance. A second upright member simply provides a flat surface or platform to receive the bottom of a hoof at an elevated position above the ground for anterior hoof work. Both uprights include upright supports which are sized and shaped to be closely and slidably received within the upright receiving portion and fixed along their respective lengths to adjust the working height by the adjustable holding mechanism.

The generally flat polyethylene base provides a safe and stable support for the stand and diminishes the chance of either the farrier or the horse from being injured by tripping over or stepping on a protruding leg. Additionally, the base provides for concussion absorption and distribution. It is formed having rounded edges and from a material which is much softer than the metal used in the prior art stand. Additionally, the edges of the cradle are rounded to reduce both the chance of injury as well as the wear on the sling. The combination of the flexible strap, such as nylon, and the plastic, or similar material base, provide a hoop support system which has been found to be much more acceptable to all horses tested.

Additional advantages and novel features of the invention will be set forth in part in the description that follows, and in part will become apparent to those skilled in the art upon examination of the following or may be learned by practice of the invention.

DETAILED DESCRIPTION OF THE INVENTION

Figure 1:
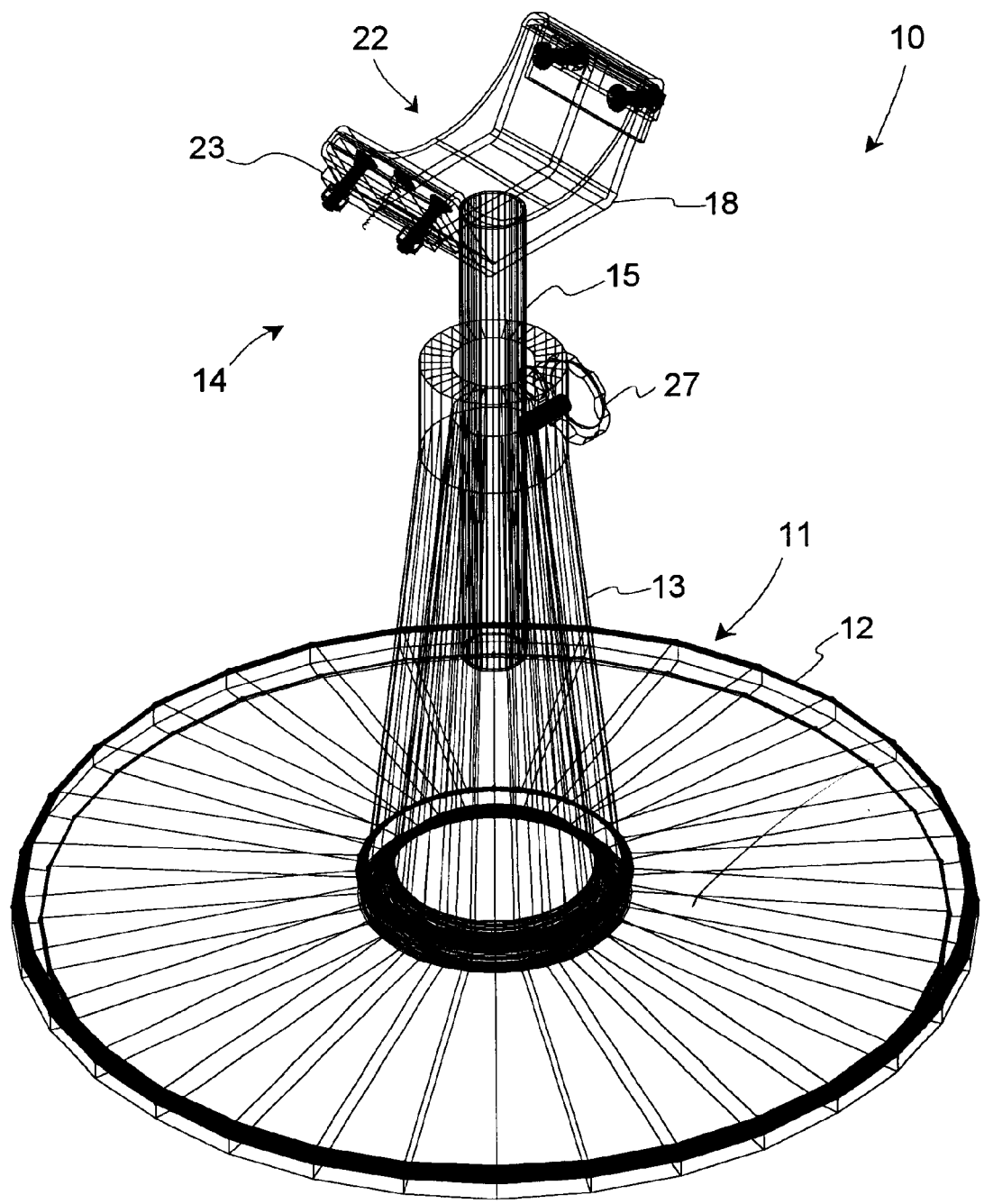
FIG. 1 is a wire frame isometric view of one embodiment of a farrier's stand according to the invention.
Figure 2:
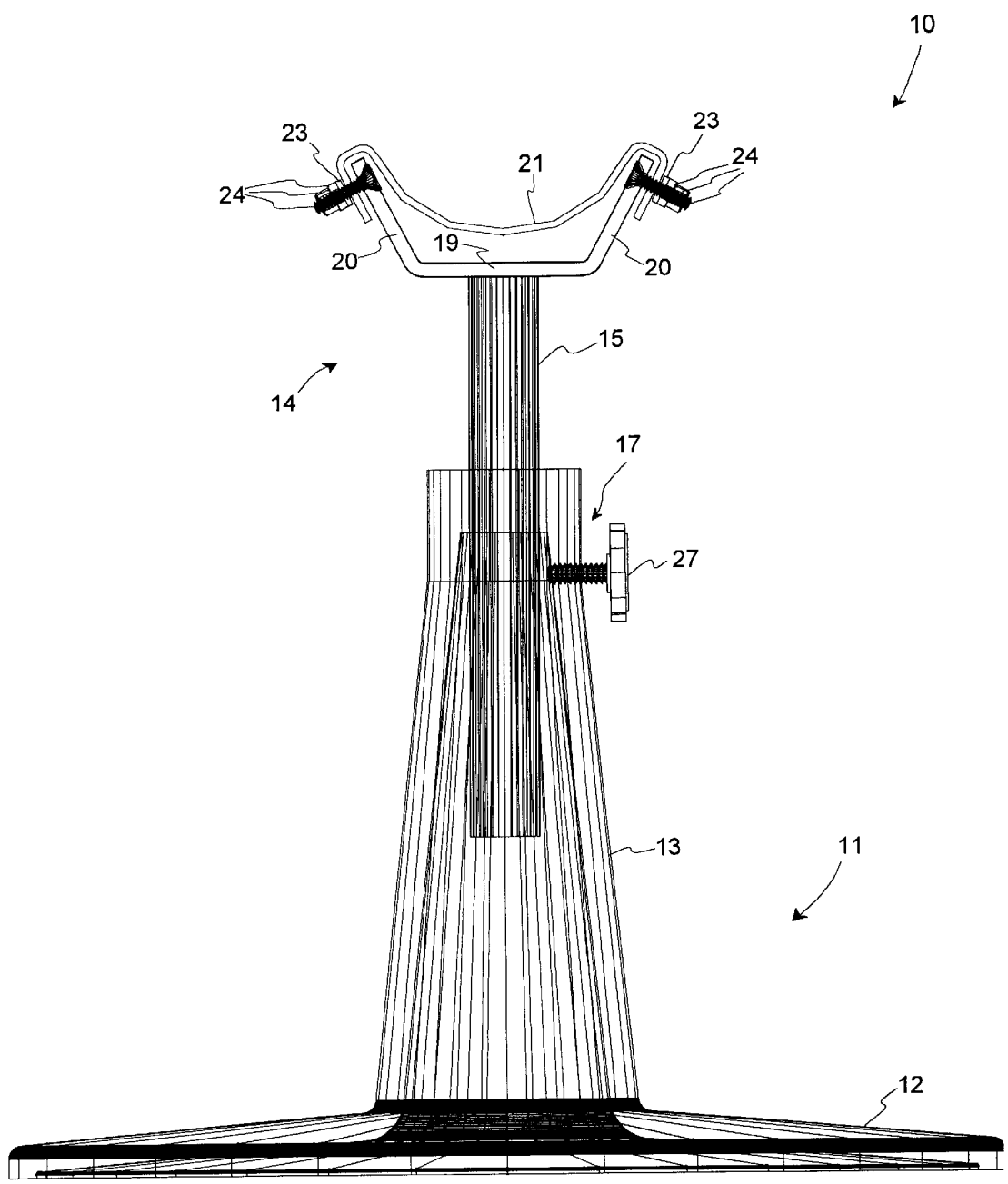
FIG. 2 is a wire frame front elevation view of one embodiment of a farrier's stand according to the invention.
Figure 3:
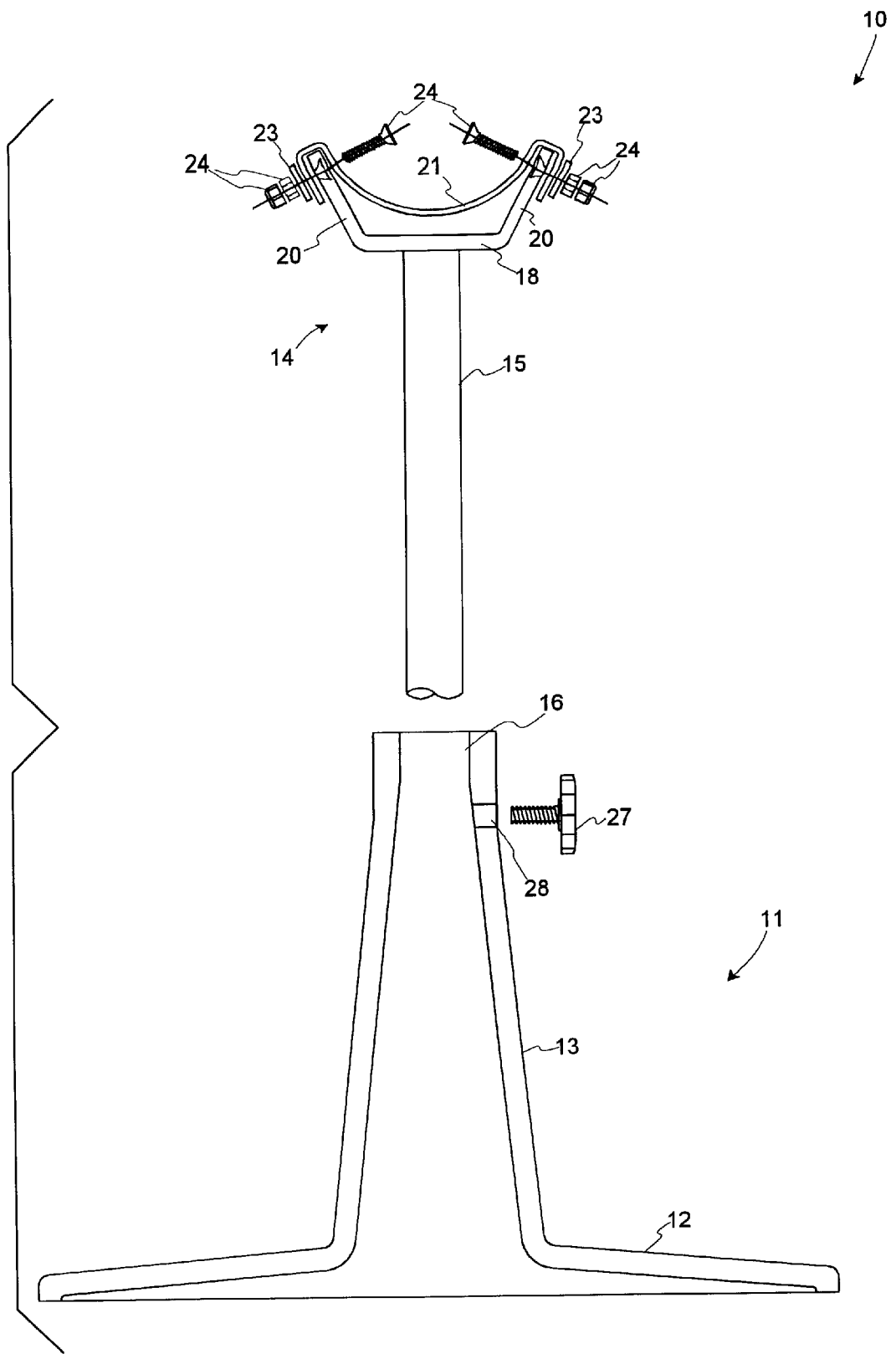
FIG. 3 is a front partial cross-sectional elevation view of one embodiment of a farrier's stand according to the invention.
Figure 4:
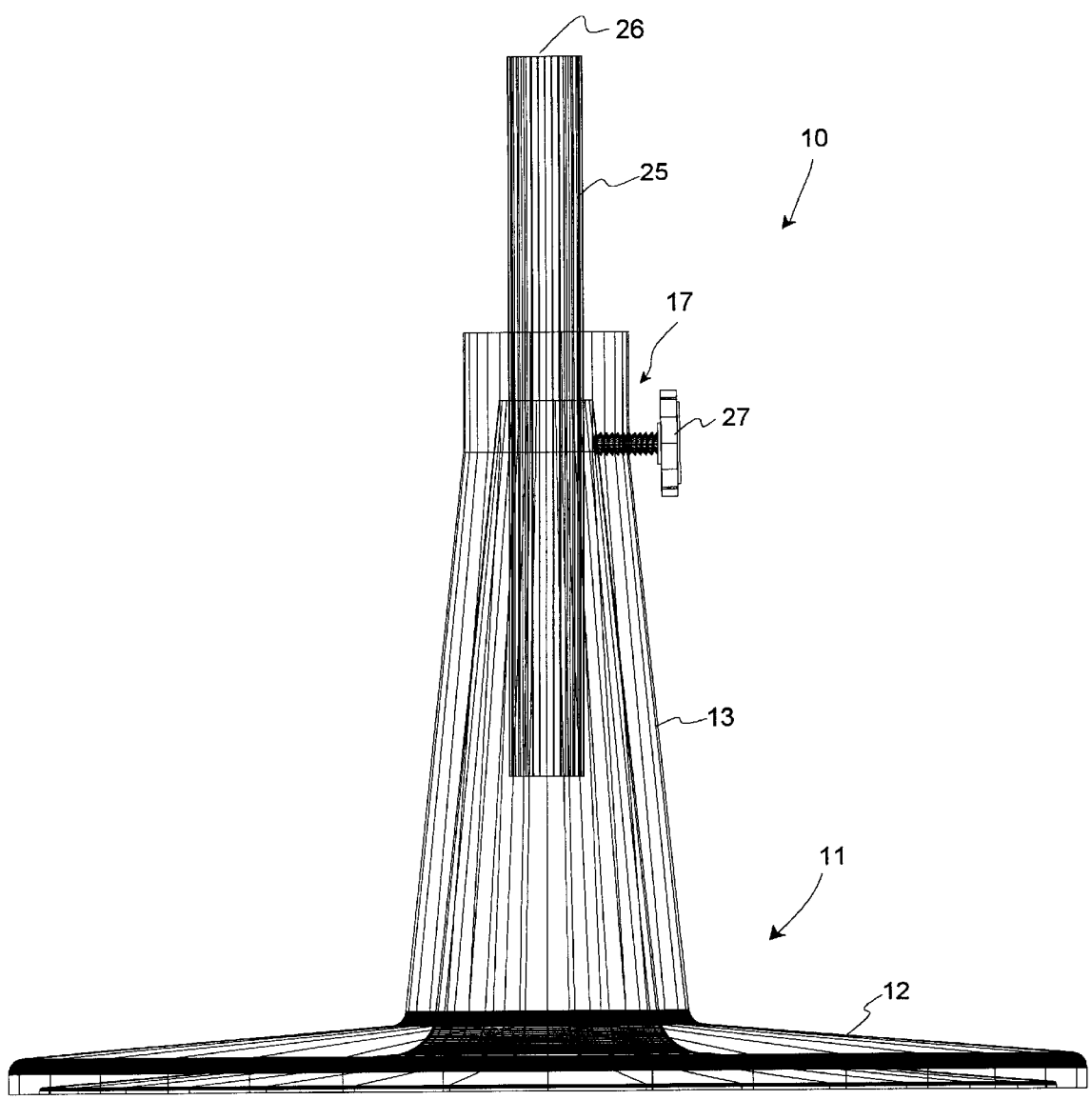
FIG. 4 is a wire frame front elevation view of one embodiment of a farrier's stand according to the invention, showing a second support upright.

Referring now to the figures a farrier's stand according to one embodiment of the invention is shown in detail and generally designated as 10 therein.

One embodiment of farrier's stand 10 includes a polyethylene base 11 formed having a large generally flat base portion 12 and a narrow truncated conical upright receiving portion 13 centrally protruding from flat base portion 12. Additionally, a first support upright 14 includes an upright member 15 which is configured to be closely but slidably held within sleeve 16 in upright receiving portion 13.

An adjustable holding mechanism 17 cooperates between upright receiving portion 13 and support upright 14 to secure the upright within the upright holder at a selected height. Here, adjustable holding mechanism 17 includes a threaded stud and thumb wheel/wing nut 27 threadedly engaged in stud hole 28 which extends through the wall forming sleeve 16. The distal end of stud 27 frictionally engages upright member 15. It should be noted that other adjustment holding mechanisms and be implemented, such as a tightening collet, pin and through hole, ratchet and pawl, or similar mechanisms.

Upright member 15 has a diverging "U" shaped cradle 18 attached at its upper distal end. Here, upright member 15 is manufactured of metal tubing having an outside diameter slightly less than the inside diameter of sleeve 16. While a circular cross-sectional shape is not critical to this aspect of the invention, it is critical that member 15 be slidably received within sleeve 16. Here, cradle 18 is from of metal strap bent to from a central web portion 19 and two outwardly and upwardly extending arms 20. The top ends of arms 20 are rounded to reduce the chance of injury and wear on strap 21.

Strap 21, here manufactured of a nylon strap material, is slung across cradle and attached to the opposing ends of arms 20 to form hoof receiving sling 22. Here, strap 21 is attached to the outside upper surfaces of arms 20 using a pair of metal strap plates 23 and cooperating bolts and nuts 24. Advantageously, the bolts are countersunk in upwardly extending arms 20. This configuration ensures that the heads of the bolts are shielded, by strap 21, from coming into contact with the hoof. Cradle 14 and strap 21 are sized to create a flexible curved surface to contact a substantial portion of the curved anterior surface of a hoof to securely hold the hoof and absorb concussion associated with nailing and hoof maintenance.

A second support upright 25 is receivable by upright receiving portion 13 in place of first support upright 14. Second support upright 25 does not have cradle 18, but instead an upper flat surface 26. Upper flat surface 26 simply provides a flat surface or platform to receive the bottom of a hoof at an elevated position above the ground for anterior hoof work.

Advantageously, base 13 is approximately twelve and one-half inches high, upright member 15 is approximately ten inches long and cradle 18 is approximately two and one-quarter inches high. Additionally, web 19 is approximately three inches long while arms 20 are approximately two and one-quarter inches long. Arms 20 upward at opposing angles of approximately sixty degrees with respect to horizontal. Strap 21 is approximately eight and one-half inches long with approximately one and three-quarter inch overlaps extending down the anterior of each arm 20, leaving approximately five inches to form sling 22. Here, strap 21 is approximately three inches wide. Second support upright 25 may be slightly longer than the height of base 13 to prevent the upright from sliding entirely within base 13. While these dimensions accommodate most horses quite well, it should be noted that at least the cradle and sling dimensions can be modified to accommodate different sized horses, such as draft horses or miniature horses.

While there are shown and described certain embodiments of the invention, it is to be distinctly understood that this invention is not limited thereto but may be variously embodied to practice within the scope of the following claims.

I claim:

1. A horse owner's and farrier's stand comprising:
   a base comprising a generally flat base portion for resting on a surface and an upright-receiving portion upending from the flat base portion;
   a support upright having a bottom end slidably received in said upright-receiving portion,
   a top end, and a longitudinal axis between said bottom end and top end;
   an adjustable holding mechanism for securing said support upright within the upright-receiving portion at a selected height, wherein the adjustable holding mechanism is a hand-adjustable set-screw system frictionally engaging the support upright so that the height of the support upright is continuously adjustable along the length of the support upright; and
   wherein the support upright further comprises at it's top end a cradle having a web and two upending arms, and a flexible strap extending between the arms and above the web for receiving a horse's foot;
   wherein the base and the support upright are both made of plastic, so that contact between the base and the support upright and adjustment of the support upright relative to the selected height involves plastic-plastic contact.

2. A stand as in claim 1, wherein the support upright and the base are polyethylene.

3. A stand as in claim 1, wherein the cradle is a diverging-U-shaped cradle wherein the web is horizontal and both of the arms diverge from each other to both be about 60° relative to horizontal.

4. A stand as in claim 3, wherein the arms each have a length that is less than the length of the web.

5. A stand as in claim 3, wherein the web is about 3" long and the arms are each about 2¼ inches long.

6. A stand as in claim 1, further comprising an alternate support upright having a bottom end slidably receivably in the upright-receiving portion and having a flat top end;
   wherein the support upright and the alternate support upright may be interchanged for different horse-care purposes.

7. A stand as in claim 1, wherein said generally flat base portion has a central region from which the upright-receiving portion upends, and an outer perimeter edge, and an upper surface that slants from the central region downward to the outer perimeter.

8. An adjustable horse owner's and farrier's stand comprising:
   a base comprising a generally flat base portion for resting on a surface and an upright-receiving portion upending from the flat base portion;
   a support upright having a bottom end slidably received in said upright-receiving portion,
   a top end, and a longitudinal axis between said bottom end and top end;
   an adjustable holding mechanism for securing said support upright within the upright-receiving portion at a selected height;
   wherein the support upright further comprises at its top end a U-shaped cradle having a generally horizontal web and two spaced arms rigidly connected to and upending from the web; and,
   a strap extending from the arms above the web for receiving a horse's foot.

9. A stand as in claim 8, wherein the cradle is a diverging-U-shaped cradle wherein the web is horizontal and both of the arms diverge from each other to both be about 60° relative to horizontal.

10. A stand as in claim 8, wherein the arms each have a length that is less than the length of the web.

11. A stand as in claim 8, wherein the web is about 3" long and the arms are each about 2¼ inches long.

12. A stand as in claim 8, further comprising:
    an alternate support upright having a bottom end slidably receivably in the upright-receiving portion and having a flat top end;
    wherein the support upright and the alternate support upright may be interchanged for different horse-care purposes.

13. A stand as in claim 8, wherein the adjustable holding mechanism is a hand-adjustable set-screw system frictionally engaging the support upright so that the height of the support upright is continuously adjustable along the length of the support upright.

14. A stand as in claim 8, wherein said generally flat base portion has a central region from which the upright-receiving portion upends, and an outer perimeter edge, and an upper surface that slants from the central region downward to the outer perimeter.

* * * * *